(12) United States Patent
Chassagnol et al.

(10) Patent No.: US 8,100,219 B2
(45) Date of Patent: Jan. 24, 2012

(54) DEVICE FOR ORIENTATING REAR WHEELS

(75) Inventors: Cedric Chassagnol, Clichy (FR);
Stephane Guegan, Versailles (FR)

(73) Assignee: Renault S.A.S., Boulogne-Billancourt (FR)

( * ) Notice: Subject to any disclaimer, the term of this patent is extended or adjusted under 35 U.S.C. 154(b) by 453 days.

(21) Appl. No.: 12/304,572

(22) PCT Filed: Apr. 12, 2007

(86) PCT No.: PCT/FR2007/051108
§ 371 (c)(1),
(2), (4) Date: Feb. 2, 2009

(87) PCT Pub. No.: WO2007/144524
PCT Pub. Date: Dec. 21, 2007

(65) Prior Publication Data
US 2009/0194359 A1    Aug. 6, 2009

(30) Foreign Application Priority Data

Jun. 14, 2006 (FR) .................................. 06 05298

(51) Int. Cl.
*B62D 7/06* (2006.01)
(52) U.S. Cl. ........................................ 180/411

(58) Field of Classification Search .................. 180/408, 180/411, 414, 415; 361/25
See application file for complete search history.

(56) References Cited

U.S. PATENT DOCUMENTS 7,596,440 B2 *  9/2009  Ono ................................. 701/41
7,619,859 B2 * 11/2009  Zeniya et al. ..................... 361/25
7,878,512 B2 *  2/2011  Horiuchi et al. ............. 280/5.522

FOREIGN PATENT DOCUMENTS

JP        63 151578      6/1988

OTHER PUBLICATIONS

U.S. Appl. No. 12/600,130, filed Nov. 13, 2009, Chassagnol, et al.

\* cited by examiner

*Primary Examiner* — Tony H. Winner
(74) *Attorney, Agent, or Firm* — Oblon, Spivak, McClelland, Maier & Neustadt, L.L.P.

(57) ABSTRACT

A device for orientating rear wheels of a vehicle, including: a rear axle fitted with two orientable wheels; an actuator including: a body with a lubricated guide bearing and an actuating member that can move relative to the body, guided by the bearing, and the movements of which orientate the wheels about the vertical of the rear axle; a temperature sensor; and a control circuit for the actuator, configured to lock movements of the actuating member when the temperature determined by the temperature sensor is below a predetermined threshold value.

7 Claims, 2 Drawing Sheets

DEVICE FOR ORIENTATING REAR WHEELS

BACKGROUND

The invention relates to vehicles that have steered wheels on several axles, and in particular relates to the devices used to orientate the rear wheels.

Rear wheel orientation devices generally comprise a hydraulic or electric actuator. Such actuators have an actuating member the movements of which alter the angular orientation of the rear wheels about the vertical of the vehicle. The grease used to lubricate the bearings that guide the actuating member create resistance to movement which increases at low temperature. In the case of a hydraulic actuator, the viscosity of the hydraulic fluid used to move the actuating member also increases appreciably. The load on the hydraulic pump used to pump the hydraulic fluid then increases appreciably. What is more, the forces needed to alter the orientation of the rear wheels increase appreciably at low speed or when the vehicle is in reverse gear.

In order to detect malfunctions, a known wheel orientation device determines when the force that needs to be applied to the actuating member is too high and locks the wheels in their orientation. Further, this device commands the illumination of a warning lamp in the cabin recommending that the user stops the vehicle and goes to the nearest garage. Thus, a drop in temperature may cause a warning lamp such as this to light up in the cabin.

As a result, a user may find himself under temperature and running conditions in which the rear wheels are locked in a non-neutral orientation for the remainder of his journey (that is to say until the ignition is switched off), and this may disrupt driving conditions. What is meant by neutral orientation is a position in which the orientations of the rear wheels are symmetric with respect to the vehicle axle centerline. The user is also needlessly alarmed by a warning lamp even though the vehicle has not actually really broken down.

BRIEF SUMMARY

The invention aims to solve one or more of these disadvantages and thus relates to an orientation device for orienting the rear wheels of a vehicle, comprising:
  a rear axle equipped with two orientable wheels;
  an actuator comprising:
    a body with a lubricated guide bearing;
    an actuating member capable of moving relative to the body, guided by the bearing, and the movements of which orient the wheels about the vertical of the rear axle;
  a temperature sensor;
  an actuator operating circuit able to command that the actuating member be locked unable to move when the temperature determined by the temperature sensor is below a predetermined threshold.

According to an alternative form, the operating circuit is able to command that the actuating member be locked in a neutral orientation of the wheels when the temperature determined by the temperature sensor is below said predetermined threshold.

According to another alternative form, the operating circuit:
  has an interface that logs the fact that the vehicle ignition has been switched on and logs the vehicle driving conditions;
  has a memory that stores whether the temperature is below the predetermined threshold when the interface receives information that the ignition has been switched on;
  commands that the actuating member be locked unable to move when a temperature below the threshold has been stored in memory and that predefined driving conditions are met.

According to yet another alternative form, the predefined driving conditions are a vehicle speed below a threshold or the selection of reverse gear.

According to yet another alternative form still, the operating circuit updates the content of the memory at predefined intervals after receiving information that the ignition has been switched on.

The invention also relates to a vehicle comprising an orientation device as described hereinabove and an engine management computer including the temperature sensor of said orientation device.

The invention further relates to a vehicle comprising an orientation device as described hereinabove, an external-temperature sensor and a display positioned in the cabin displaying the temperature determined by the external-temperature sensor, the temperature sensor of the orientation device being said external-temperature sensor.

BRIEF DESCRIPTION OF THE DRAWINGS

Further features and advantages of the invention will become clearly apparent from the description which is given hereinafter by way of nonlimiting indication with reference to the attached drawings in which.

DETAILED DESCRIPTION

The invention proposes being able to lock the rear wheels in an orientation with respect to the vertical of the axle or of the vehicle when a parameter representative of the resistance to motion applied by the grease used to lubricate a bearing that guides an actuating member crosses a threshold value. This is typically what happens when the temperature determined by a sensor is below a predetermined threshold. The temperature threshold may, for example, be set at −20°, −25° or −30° C.

Thus, the rear wheel orientation device makes it possible not to alter the orientation of the wheels when the force that would need to be applied in order to move the actuating member that orientates the wheels would be too high. This also avoids triggering a warning lamp in the cabin as a result of excessive force applied on the actuating member as it moves. The solution according to the invention also makes it possible not to have to overengineer the actuator or change the grease used to lubricate the bearing. Significant additional cost of the rear wheel orientation device is thus avoided. Further, the invention is advantageously applied to a hydraulic actuator in which the increase in hydraulic fluid viscosity at low temperature also gives rise to an increase in the load on a hydraulic pump.

Figure 1:
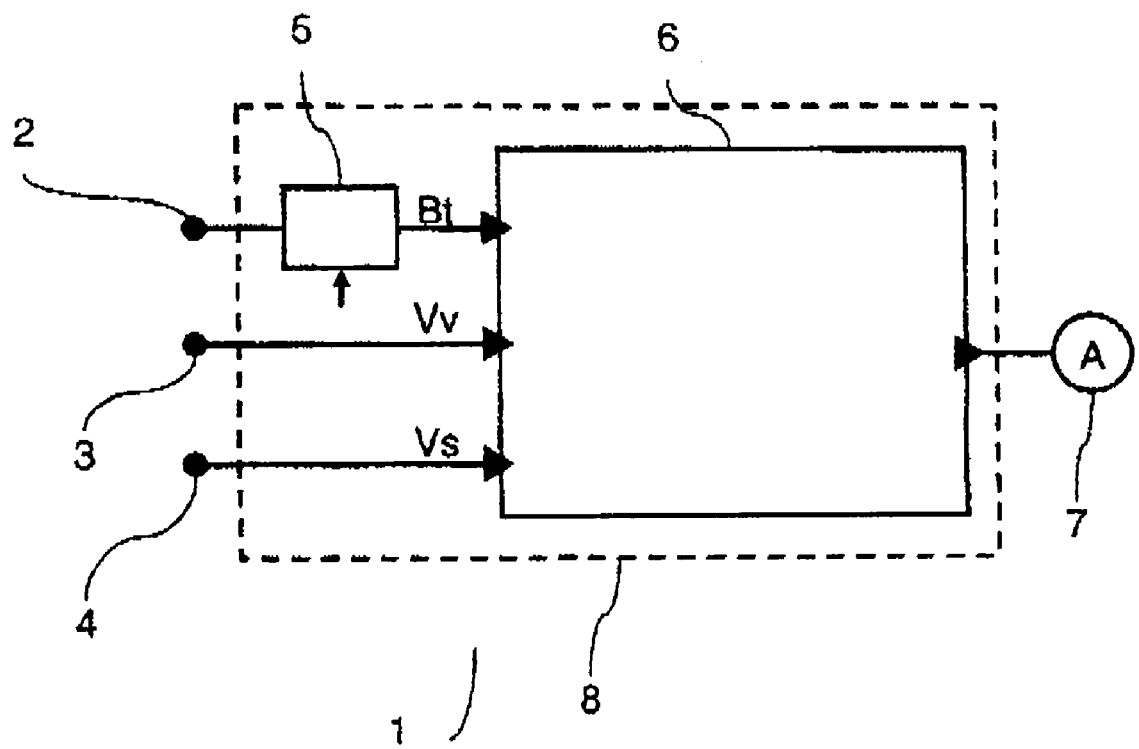
FIG. 1 schematically depicts elements of an orientation device according to the invention.
Figure 3:
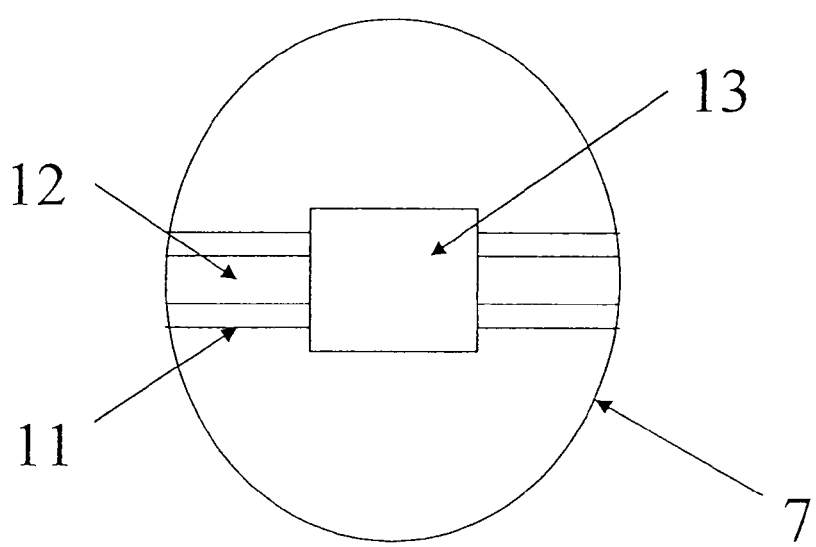
FIG. 3 schematically depicts a detailed view of the actuator.

FIG. 1 depicts part of a rear wheel orientation device 1 of a vehicle. The orientation device 1 comprises an operating circuit 8 for controlling a hydraulic actuator 7. As shown in FIG. 3, the actuator 7 comprises a body 11 equipped with a lubricated guide bearing 12. The actuator 7 also comprises an actuating member 13 capable of moving relative to the body 11 and guided by the bearing 12. The orientation device 1 also comprises a temperature sensor 2. The temperature sensor 2 is connected to a temperature comparison circuit 5. On receipt of an initializing signal, the circuit 5 samples the temperature supplied by the sensor 2 and compares it against a predefined temperature threshold, when the sampled temperature is below the temperature threshold, a signal Bt indicating a low temperature is generated and applied to a reception interface of a control circuit 6. The initialization signal may typically correspond to a signal that the vehicle ignition has been switched on or that the vehicle has been started. The operating circuit 8 may then advantageously store in memory the signal Bt that indicates the fact that the temperature was low after having received an initialization signal such as this.

It is possible to conceive of a temperature sensor 2 that directly determines the temperature of the hydraulic fluid of the actuator 7 or the temperature near the actuator.

Figure 2:
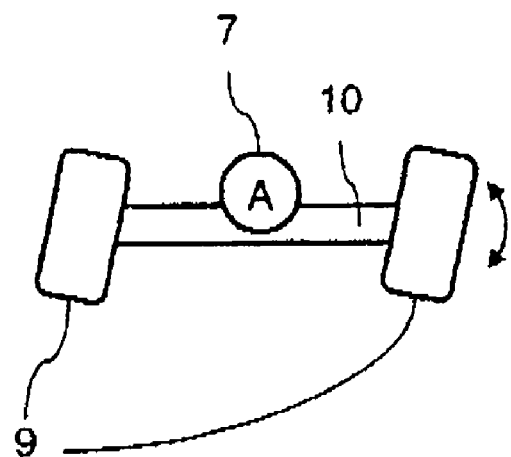
FIG. 2 schematically depicts a rear wheel orientation device viewed from above.

The movements of the actuating member of the actuator 7 orient the wheels 9 about the vertical of the rear axle 10 in a way known per se, as illustrated in FIG. 2. Under normal operating conditions, the control circuit 6 generates commands to orient the rear wheels which are intended to influence the steering of the vehicle according to driving conditions. The control circuit 6 is able to generate a command for the actuating member such that the rear wheels are kept in one orientation when a signal Bt indicating a low temperature is received. Advantageously, the operating circuit locks the actuating member in a neutral wheel orientation.

In a simplified operating embodiment, provision may be made for the actuating member to keep the wheels in a position as soon as a signal Bt indicating a low temperature is generated. The wheels may in particular be kept in position by interrupting the supply of electrical power to the actuator 7.

Advantageously, the control device 8 commands that the rear wheels be kept in their orientation when predefined driving conditions are met. In order to determine such driving conditions, the control circuit 6 has a reception interface intended to receive the signals Vv and Vs from a vehicle speed sensor and a reverse gear selection sensor, respectively. This is because it is typically at low speed and in reverse gear that the forces that the actuator 7 has to generate in order to orient the rear wheels become the greatest.

When the signal Bt that indicates a low temperature has been stored in memory, a variation in the orientation of the wheels may be authorized if the speed is above a threshold and it reverse gear has not been selected, then the orientation may be locked again or returned to a neutral orientation upon a return to low speed or upon selection of reverse gear. In particular, it is possible to have a speed threshold of 5, 10 or 15 km/h. Provision may be made for the speed threshold that triggers a command to orient the wheels to a neutral position to be higher than the threshold at which the orientation of the wheels is unlocked. There is then a guarantee that it will be possible to return the wheels to a neutral position, as this operation is performed at a speed at which the force that needs to be applied is lower.

In order not to lock the wheels needlessly in any given orientation, it is also possible to make provision for an initialization signal to be applied at predefined intervals during vehicle operation, so as to update the status of the signal Bt.

When the orientation device 1 is incorporated into a vehicle, the temperature sensor 2 is advantageously a temperature sensor that forms part of an engine management computer, intended to determine the temperature outside the vehicle.

Provision may also be made for the temperature sensor 2 to be an external-temperature sensor connected to a display positioned in the cabin in order to display the measured temperature.

The orientation device may thus employ a minimum of components which are specific to it, in order to reduce the production cost thereof.

The invention claimed is:

1. An orientation device for orienting rear wheels of a vehicle, comprising:
   a rear axle comprising two orientable wheels;
   an actuator comprising:
      a body with a lubricated guide bearing, and
      an actuating member configured to move relative to the body, guided by the bearing, and movements of which orient the wheels about the vertical of the rear axle;
   a temperature sensor; and
   an actuator operating circuit configured to command that the actuating member be locked unable to move when a temperature determined by the temperature sensor is below a predetermined threshold.

2. The steering device as claimed in claim 1, in which the operating circuit is further configured to command that the actuating member be locked in a neutral orientation of the wheels when the temperature determined by the temperature sensor is below the predetermined threshold.

3. The steering device as claimed in claim 1, in which the operating circuit:
   comprises an interface that logs whether a vehicle ignition has been switched on and logs vehicle driving conditions;
   comprises a memory that stores whether the temperature is below the predetermined threshold when the interface receives information that the ignition has been switched on; and
   commands that the actuating member be locked unable to move when the temperature below the threshold has been stored in memory and that predefined driving conditions are met.

4. The steering device as claimed in claim 3, in which the predefined driving conditions are a vehicle speed below a threshold or selection of reverse gear.

5. The steering device as claimed in claim 3, in which the operating circuit updates content of the memory at predefined intervals after receiving information that the ignition has been switched on.

6. A vehicle comprising:
   an orientation device as claimed in claim 1; and
   an engine management computer including the temperature sensor of the orientation device.

7. A vehicle comprising:
   an orientation device as claimed in claim 1; and
   an external-temperature sensor and a display positioned in a cabin displaying the temperature determined by the external-temperature sensor, the temperature sensor of the orientation device being the external-temperature sensor.

* * * * *